United States Patent [19]

Miller et al.

[11] Patent Number: 5,091,469

[45] Date of Patent: Feb. 25, 1992

[54] COMPATIBILIZED EPOXY/POLYAMIDE COMPOSITIONS CONTAINING POLYOLEFINS

[75] Inventors: Richard A. Miller, Kingsport; David J. Olsen, Jonesborough, both of Tenn.

[73] Assignee: Eastman Kodak Company, Rochester, N.Y.

[21] Appl. No.: 545,166

[22] Filed: Jun. 28, 1990

[51] Int. Cl.$^5$ .................. C08L 63/00; C08L 77/00
[52] U.S. Cl. .................................. 525/65; 525/66; 525/108; 525/120
[58] Field of Search ................ 525/65, 66, 108, 120

[56] References Cited

U.S. PATENT DOCUMENTS

| | | | |
|---|---|---|---|
| 3,375,300 | 3/1968 | Ropp | 260/857 |
| 3,480,580 | 11/1969 | Joyner et al. | 260/29.6 |
| 3,519,609 | 7/1970 | McConnell et al. | 260/88.2 |
| 4,517,340 | 5/1985 | Read et al. | 525/113 |
| 4,555,546 | 11/1985 | Patel | 525/194 |
| 4,654,402 | 3/1987 | Patel | 525/74 |
| 4,801,647 | 1/1989 | Wolfe | 525/74 |
| 4,820,367 | 4/1989 | Cuzin | 156/283 |
| 4,822,683 | 4/1989 | Schappert et al. | 428/414 |
| 4,840,980 | 6/1989 | Pekarik | 523/456 |
| 4,845,168 | 7/1989 | Dykes et al. | 525/423 |
| 4,853,456 | 8/1989 | Sellstrom et al. | 528/111 |
| 4,855,358 | 8/1989 | Hart | 525/113 |
| 4,857,568 | 8/1989 | Butters et al. | 523/456 |
| 4,871,803 | 10/1989 | Zimmel et al. | 525/89 |

FOREIGN PATENT DOCUMENTS 60-137921  7/1985  Japan .................. 525/108

OTHER PUBLICATIONS

Lee and Neville, *Handbook of Epoxy Resins*, 1967, pp. 10–15, 21–34, 35.
F. Ide and A. Hasegawa, *J. of Applied Polymer Science*, vol. 18, pp. 963–974 (1974).
Derwent Abstract WPI Acc. No. 89-026378/04.
Derwent Abstract WPI Acc. No. 88-121063/18.
Derwent Abstract WPI Acc. No. 85-279276/45.
Derwent Abstract WPI Acc. No. 85-045577/08.
Chemical Abstracts No. CA80(24):134414y.

*Primary Examiner*—John C. Bleutge
*Assistant Examiner*—Thomas Hamilton, III
*Attorney, Agent, or Firm*—Thomas R. Savitsky; Betty J. Deaton; William P. Heath, Jr.

[57] ABSTRACT

Disclosed are epoxy/polyamide adhesive compositions having improved flexibility containing a polyolefin and a maleated polypropylene. A typical epoxy/polyamide adhesive is bisphenol A/epichlorohydrin.

6 Claims, No Drawings

COMPATIBILIZED EPOXY/POLYAMIDE COMPOSITIONS CONTAINING POLYOLEFINS

FIELD OF THE INVENTION

This invention concerns epoxy/polyamide adhesive compositions having improved flexibility. The compositions contain a polyolefin and a maleated polypropylene.

BACKGROUND OF THE INVENTION

Epoxy/Polyamide adhesives as typified by bisphenol A/epichlorohydrin are in common use in the sealant and adhesive industry. Epoxy/polyamide systems are known for their brittleness. Attempts to flexibilize these systems and lower the overall cost of the formulation by addition of polyolefins failed due to incompatibility of the polyolefin with both the epoxy resin and the polyamide resin. It would by highly desirable to have a means for compatibilizing the polyolefins with the epoxy resins and/or polyamide resin in order to achieve a more flexible adhesive formulation.

SUMMARY OF THE INVENTION

The present invention is directed to an adhesive composition, or composition useful for the preparation thereof, which contains a polyolefin as a flexibilizing agent and a maleated polypropylene as a compatibilizing agent. More specifically, the present invention is directed to a compatibilized composition useful for preparing an adhesive comprising:

(A) about 49 to about 99 weight % of a polyamide,
(B) about 0.5 to about 50 weight % of a polyolefin, and
(C) about 0.2 to about 50 weight % of a maleated polypropylene.

In a preferred embodiment, the present invention is directed to a compatibilized adhesive composition comprising:

(A) about 33 to about 49 weight % of a polyamide,
(B) about 0.5 to about 31 weight % of a polyolefin,
(C) about 0.1 to about 33 weight % of a maleated polypropylene, and
(D) about 33 to about 49 weight % of an epoxy resin.

DETAILED DESCRIPTION OF THE INVENTION

By the term "compatible" and derivative terms thereof is meant that upon melting and mixing the components of the composition are non-opaque, heat stable, non-phase separating, and homogeneous; and conversely, by the term "incompatible" and derivative terms thereof is meant that upon melting and mixing the components of the composition do not have at least one of the foregoing properties.

The adhesives of the present invention exhibit an increase in short term flexibility. It is not desired to be bound by any particular theory or mechanism; however, it is believed that this increase in flexibility is due to a decrease in the crosslinking rate with the polyolefin acting as a diluent. This would allow formulators to reposition and work with the adhesive before total crosslinking occurred.

In addition to improved flexibility, another advantage of the present invention is that the addition of polyolefin can lower a formulators cost to produce an adhesive.

In the compositions of the present invention useful for preparing an adhesive (i.e., without the epoxy resin) it is preferred that component (A) is present in an amount of about 82 to about 95 weight % component (B) is present in an amount of about 4 to about 17 weight %; and component (C) is present in an amount of about 0.2 to about 3 weight %. In order to obtain a useful adhesive the mixture of component (A/component (B)/component (C) must be blended with an epoxy resin. In the preferred adhesive composition of the present invention containing an epoxy resin, it is preferred that component (A) is present in an amount of about 45 to about 49 weight %; component (B) is present in an amount of about 1 to about 10 weight %; component (C) is present in an amount of about 0.1 to about 1 weight %; and component (D) is present in an amount of about 45 to about 49 weight %. All of the aforementioned weight percentages are based on the total weight of the composition.

The compositions of the present invention can be prepared by blending together the appropriate components using conventional blending techniques known in the adhesive art.

An epoxy resin suitable for use in the present invention useful as component (D) preferably comprises at least two 1,2-epoxy ring structures in the molecule, and is conveniently derived from an epoxy compound of the general formula:

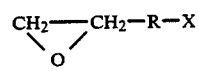

wherein:

R is an alkylene group (branched or linear) of up to 4 carbon atoms, and

X is a reactive group particularly a halogen—such as chlorine or bromine. Such epoxy compounds include an epihalohydrin, particularly epichlorohydrin or β-methylepichlorohydrin.

A preferred polyepoxy resin is prepared by condensation of the reactive group X of the aforementioned compound with a compound containing an active hydrogen atom—in for example, a phenolic hydroxyl, a carboxylic or an amino group. Suitable reactive compounds include 4,4'-diaminodiphenylmethane, 1,4-butanediol, resorcinol, glycerol, penterythritol and phenolic novolacs. A particularly preferred polyepoxy resin is obtained by condensation of epichlorohydrin with a bisphenol A to yield a polymer having the repeat unit:

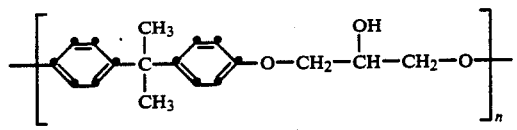

wherein: n is a positive integer.

The epoxy resin suitably has an epoxy molar mass (grams of resin containing 1 gram-equivalent of epoxide) of from about 100 to 5,000, preferably from about 150 to about 250, and particularly from 180 to 195.

Preferred epoxy resins are sold by Shell Chemical Company under the designation "EPON", such as EPON Resin 1007F, EPON Resin 828, EPON Resin 1009F and EPON Resin 1004, all of which are 4,4'-isopropylidenediphenol-epichlorohydrin resins.

The polyamide resins suitable for use in the present invention are those resins that are conventionally used in epoxy adhesives. These polyamides are characterized by the fact that their amide linkages are separated by an average of at least fifteen carbon atoms and have amorphous structures in contrast with the more highly crystalline, fiber forming polyamides such as nylon 6 or nylon 66.

Polyamide resins useful in the present invention as component (A) are low molecular polymers containing reactive amino groups adapted to be activated and become coreactive with epoxy resin. Polyamides are polycondensation products wherein the recurring or linking unit is the amide grouping —CONH—. Many methods of producing polyamide are known although most methods are based on a dehydration reaction occurring between organic carboxylic acid and amine upon heating. For instance, heating a simple dicarboxylic acid with equal equivalents of a simple aliphatic diamine produces substantially a linear polyamide. A similar reaction can occur between monoamines and dicarboxylic acids, monocarboxylic acids and diamines, and between di- or polyamines and di- or polybasic acids. Sufficient aliphate chains between functional groups promotes polymer formation. A wide variety of polyamides are possible since these can be based on a wide variety of polyamines and polybasic acids as well as mixtures of two or more of these essential reactants. Modifications are possible in functionality as well as in number of reactants, and in addition polyamides, linear or branched, can be effectively chain-terminated by any one of a large number of monobasic acids or monoamines. The end groups in polyamide resins can be amine groups, carboxylic acid groups, or both. Lower molecular weight branched polymers on the other hand, possess a relatively large content of end groups. For example, dimer or trimer fatty acids, such as dimerized linoleic acid, can be coreacted with branched chain polyamines such as diethylene triamine. By adjusting the relative equivalents of the respective reactants, a wide range of relatively low molecular weight polyamide resins can be formulated. The reaction can be carried out in a stainless steel vessel fitted with an inert gas line, agitator and condenser. By heating together, for example, dimer acid and ethylene diamine solution in an atmosphere of nitrogen with constant agitation, water is evolved first from the ethylene diamine solution and then, as the temperature rises, from the dehydration reaction itself. Heating is continued until the temperature approaches 200° C., water being allowed to escape through the condenser. As the product becomes resinous it is checked at intervals until the desired acid value, amine number and viscosity have been reached whereupon the resulting polyamine resin can be thinned with an organic solvent if necessary to provide a fluid resin material. Polyamides useful herein preferably contain at least two reactive amine groups per polymer molecule to facilitate cross-linking. Suitable polyamides typically have molecular weights up to about 10,000 and preferably between 100 and 5,000. The polyamine number (value) desirably is between 75 and 750 mg koh/gm. The free amine groups in the condensed polyamide resin provide cross-linking sites for coreaction with epoxy resin. Polyamide resin, especially those containing a branched chain structure and a multiplicity of primary amino end groups are particularly useful in a cross-linking reaction with epoxy resin. Materials commercially available from Quaker Chemical under the trademark VERSAMID, such as VERSAMID 140, are quite useful herein.

The polyolefins useful in the present invention as component (B) are non-maleated, substantially amorphous polyolefins.

Substantially amorphous polyolefins useful in the practice of this invention include substantially amorphous homopolymers of 1-olefins containing 3 to 5 carbon atoms, substantially amorphous copolymers prepared from ethylene and 1-olefins containing 3 to 5 carbon atoms, and substantially amorphous propylene or 1-butene/higher 1-olefin copolymers containing less than 40 mole percent of at least one higher 1-olefin of the group 1-hexane, 1-heptene, 1-octene, 1-nonene, and 1-decene. In defining these polymeric compositions it should be noted that the term "amorphous" as used herein defines a polymeric composition that may contain a small amount of crystallizable portion. Also, these substantially amorphous polyolefins can be used as a blend with crystalline polyolefins. The crystallizable polymer component of these blends, however, should not exceed about 20% crystalline polymer. Preferred polyolefins are polypropylene homopolymer, propylene butene copolymers, propylene hexene copolymers and propylene ethylene copolymers.

The maleated polypropylene for use in the present invention as component (C) can be of several types known in the art. One type is a relatively low molecular weight polymer containing at least 90 weight percent propylene units that is maleated to an acid number of about 1-100, preferred is about 20-60 and most preferred is about 45-55. The relatively low molecular weight polymer that is to be maleated is substantially crystalline and preferably contains at least 95 weight percent propylene repeating units and is more preferably a homopolymer of propylene. This polymer can also be a copolymer of propylene and at least one $C_2$ to $C_8$ copolymerizable 1-olefin. The molecular weight of the polymer is preferably about 2,000–20,000, more preferably about 2,000–10,000. This molecular weight can be achieved by thermally degrading a high molecular weight polypropylene as taught in U.S. Pat. No. 3,519,609, incorporated herein by reference in its entirety. The maleated polypropylene also typically has a Brookfield viscosity of about 100 to about 5,000 centipoise (cp), preferably about 200 to about 4,000 cp, and more preferably about 200 to about 1,000 cp. Brookfield viscosity can be determined by ASTM Procedure D4402. To achieve the desired acid number, such a polymer typically contains about 0.25-15 weight percent maleic anhydride residues, more preferably about 5-10 weight percent. A preferred, maleated, lower molecular weight propylene-type polymer useful in the present invention is Epolene ® 43, available from Eastman Chemical Products, Inc., Kingsport, Tenn., U.S.A, which has an acid number of 47. Such a maleated polymer can be prepared by techniques disclosed in U.S. Pat. No. 3,480,580, incorporated herein by reference in its entirety.

The compositions of the present invention can optionally contain up to about 20 weight %, preferably about 2 to about 20 weight %, of an additional additive. Such additional additives include pigments, reinforcements, thixotropes, plasticizers, extenders, stabilizers and antioxidants. The claimed compositions can be prepared in a number of ways either as a one-package type of composition or as a two-package composition.

Useful pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber chromium oxide green, phthalocyanine green, phthalonitrile blue, ultramarine blue, cadmium pigments, chromium pigments, and the like. Filter pigments such as clay, silica, talc, mica, wollastonite, wood flour and the like can be added. Thixotropic agents contemplated as conventional thixotropic agents such as fumed silica or certain Bentone clays.

The adhesive compositions of the present invention exhibit excellent physical properties (such as bonding properties) in addition to the flexibility and economic advantages cited above. The increased short term flexibility of the adhesive composition of the present invention is particularly useful in those situations where repositioning of the substrates is necessary or desirable, such as FORMICA® laminated plastic to particle board laminates.

The present invention is further illustrated by the following non-limiting examples. Adhesive blends were prepared by melt blending with stirring. The compositions of the blends are in the tables that follow. The blends ere evaluated for compatibility/incompatibility by visual examination. The blends were evaluated for flexibility by the following procedure performed at room temperature:
1. Cast 10 mils of blend onto a cold rolled steel panel.
2. Cool for 72 hours.
3. Bend cured sample to 180 degrees and measure the degree of bend until cured sample shows cracking.

The results of the compatibility and flexibility evaluations are also in the tables that follow. All percentages and parts are by weight unless otherwise indicated.

TABLE 1
COMPATIBILITY OF EPOXY/POLYAMIDE/POLYOLEFIN BLENDS

| System | | Compat/Incompat |
|---|---|---|
| A. EPON 828 | 100 parts | Incompatible |
| V-140 | 100 parts | cracking after 1 |
| APE D-112 | 20 parts | hour compounding |
| B. EPON 828 | 100 parts | Incompatible |
| V-140 | 100 parts | |
| APP M5H | 20 parts | |
| C. EPON 828 | 100 parts | Incompatible |
| V-140 | 100 parts | cracking after 1 |
| APB D-124 | 20 parts | hour compounding |
| D. EPON 828 | 100 parts | Incompatible |
| V-140 | 100 parts | |
| APH D-127 | 20 parts | |

EPON 828 is an epoxy resin from Shell. V-140 is VERSAMID 140 which is an amide resin from Quaker Chemical. M5H is an amorphous polypropylene from Eastman Chemical Products, Inc. D-112 is an amorphous propylene ethylene (APE) copolymer containing 18% ethylene, D-124 is an amorphous propylene butene (APB) copolymer containing 45% 1-butene, and D-127 is an amorphous propylene hexene copolymer (APH) containing 62% 1-hexene.

TABLE 2
COMPATIBILIZATION OF EPOXY/POLYAMIDE/POLYOLEFIN BLENDS BY EPOLENE E-43 WAX (.5% ADDED)

| Adhesive Blend | Polyolefin | Polyolefin Parts Added | Compatible (C)/ Incompatible (I) | Degree Bend Until Cracking |
|---|---|---|---|---|
| Epoxy/Polyamide | None | 0 | — | 0 (Cracked Immediately) |
| Epoxy/Polyamide | APE D-112 | 5 | C | 100 |
| | | 10 | C | 60 |
| | | 15 | C | 60 |
| | | 20 | C | 180 |
| Epoxy/Polyamide | APE M5F | 5 | C | 180 |
| | | 10 | C | 180 |
| | | 15 | C | 180 |
| | | 20 | C | 180 |
| Epoxy/Polyamide | APE D-117 | 5 | C | 180 |
| | | 10 | C | 180 |
| | | 15 | C | 90 |
| | | 20 | C | 180 |
| Epoxy/Polyamide | APE D-118 | 5 | C | 60 |
| | | 10 | C | 90 |
| | | 15 | C | 180 |
| | | 20 | C | 180 |
| Epoxy/Polyamide | APH D-127 | 5 | C | 90 |
| | | 10 | C | 180 |
| | | 15 | SC | 180 |
| | | 20 | I | — |
| Epoxy/Polyamide | APH D-129 | 5 | C | 180 |
| | | 10 | C | 180 |
| | | 15 | C | 180 |
| | | 20 | C | 180 |
| Epoxy/Polyamide | APH D-133 | 5 | C | 180 |
| | | 10 | C | 180 |
| | | 15 | C | 180 |
| | | 20 | C | 180 |
| Epoxy/Polyamide | APH D-134 | 5 | C | 120 |
| | | 10 | C | 180 |
| | | 15 | C | 180 |
| | | 20 | C | 90 |
| Epoxy/Polyamide | APP D-137 | 5 | C | 180 |
| | | 10 | C | 60 |
| | | 15 | C | 180 |
| | | 20 | C | 180 |
| Epoxy/Polyamide | APE D-138 | 5 | C | 180 |
| | | 10 | C | 180 |
| | | 15 | C | 180 |
| | | 20 | C | 180 |
| Epoxy/Polyamide | APB D-139 | 5 | C | 180 |
| | | 10 | C | 90 |
| | | 15 | C | 90 |
| | | 20 | C | 60 |

SC = compatible with haze.
Formulation for all evaluations:
100 Parts EPON 828 epoxy resin
100 Parts VERSAMID-140 polyamide
5-20 Parts polyolefin
.5% E-43 maleated polypropylene
Samples repeated with .25% and 1% E-43 gave identical compatibility to the .5% Table. Blends were not measured.
APB D-139 = Amorphous propylene butene copolymer containing 40% 1-butene.
APE D-112 = Amorphous propylene ethylene copolymer containing 18% ethylene.
APE M5F = Amorphous propylene ethylene copolymer containing 13% ethylene.
APE D-117 = Amorphous propylene ethylene copolymer containing 13% ethylene.
APE D-118 = Amorphous propylene ethylene copolymer containing 13% ethylene.
APE D-138 = Amorphous propylene.
APH D-127 = Amorphous propylene hexene copolymer containing 62% 1-hexene.
APH D-129 = Amorphous propylene hexene copolymer containing 62% 1-hexene.
APH D-133 = Amorphous propylene hexene copolymer containing 34% 1-hexene.
APH D-134 = Amorphous propylene hexene copolymer containing 13% 1-hexene.
APP D-137 = Amorphous polypropylene.

TABLE 3
COMPATIBILIZATION OF POLYOLEFIN AND POLYAMIDE RESIN BY .2-3% EPOLENE E-43 MALEATED POLYPROPYLENE

| Polyamide | Polyolefin | % Polyolefin | % Epolene E-43 | Compatible (C)/ Incompatible (I) |
|---|---|---|---|---|
| | APP M5H | 5 | .2-3 | C |
| | | 10 | .2-3 | C |
| | | 15 | .2-3 | C |
| | | 20 | .2-3 | C |
| | APE | 5 | .2-3 | C |

TABLE 3-continued

COMPATIBILIZATION OF POLYOLEFIN AND POLYAMIDE RESIN BY .2-3% EPOLENE E-43 MALEATED POLYPROPYLENE

| Poly-amide | Poly-olefin | % Polyolefin | % Epolene E-43 | Compatible (C)/ Incompatible (I) |
|---|---|---|---|---|
| | M5F | 10 | .2-3 | C |
| | | 15 | .2-3 | C |
| | | 20 | .2-3 | C |
| | APB | 5 | .2-3 | C |
| | D-125 | 10 | .2-3 | C |
| | | 15 | .2-3 | C |
| | | 20 | .2-3 | C |
| | APH | 5 | .2-3 | C |
| | D-127 | 10 | .2-3 | C |
| | | 15 | .2-3 | C |
| | | 20 | .2-3 | C |

All levels of E-43 addition (0.2, 0.5, 1, and 3 weight %) compatibilized 5-20% polyolefin in polyamide resin. See Tables 1 and 2 for description of polyolefins.

TABLE 4

COMPATIBILIZATION OF POLYOLEFIN POLYAMIDE BLENDS BY EPOLENE E-43 HIGH ADDITION LEVELS

| Poly-olefin | Parts Poly-olefin | Parts Polyamide | Parts Epolene E-43 | Compatible (C)/ Incompatible (I) |
|---|---|---|---|---|
| APE | 49 | 50 | 1 | C |
| M5F | 42 | 50 | 8 | C |
| APP | 49 | 50 | 1 | C |
| M5H | 42 | 50 | 8 | C |
| APB | 49 | 50 | 1 | C |
| D-124 | 42 | 50 | 8 | C |
| APH | 49 | 50 | 1 | C |
| D-127 | 42 | 50 | 8 | C |
| APE | 49 | 50 | 1 | C |
| D-144 | 42 | 50 | 8 | C |
| None | — | 100 | 100 | C |
| — | | 100 | 50 | C |

See Tables 1 and 2 for polyolefin descriptions. Polyamide was VERSAMID 140.

The invention has been described in detail with particular reference to preferred embodiments thereof, but it will be understood that variations and modifications can be effected within the spirit and scope of the invention.

We claim:

1. A compatibilized adhesive composition comprising:
   (A) about 33 to about 49 weight % of a polyamide,
   (B) about 0.5 to about 31 weight % of a polyolefin, and
   (C) about 0.1 to about 33 weight % of a maleated polypropylene, and
   (D) about 33 to about 49 weight % of an epoxy resin having an epoxy molar mass at from about 100 to 5,000.

2. The composition of claim 1 comprising about 45 to about 49 weight % of component (A), about 1 to about 10 weight % of component (B), about 0.1 to about 1 weight % of component (C), and about 45 to about 49 weight % of component (D).

3. The composition of claim 1 wherein said polyolefin is amorphous polypropylene, a propylene butene copolymer, a propylene hexene copolymer, a propylene ethylene copolymer, or a mixture thereof.

4. The composition of claim 1 wherein said maleated propylene has a molecular weight of about 2,000 to about 20,000, is maleated to an acid number of about 1 to about 100, and has a Brookfield viscosity of about 100 to about 1,000 as measured by ASTM Procedure D4402.

5. The composition of claim 1 containing up to about 20 weight % of one or more additional additives.

6. The composition of claim 1 wherein said epoxy resin is a bisphenol A/epichlorohydrin epoxy resin.

* * * * *